No. 630,769. Patented Aug. 8, 1899.
G. D. BIRD.
FISH SCREEN FOR ARTIFICIAL WATERWAYS.
(Application filed May 4, 1899.)

(No Model.)

WITNESSES:
Jos. A. Ryan
Edw. W. Byrn.

INVENTOR
George D. Bird
BY Munn & Co.
ATTORNEYS.

THE NORRIS PETERS CO., PHOTO-LITHO., WASHINGTON, D. C.

UNITED STATES PATENT OFFICE.

GEORGE D. BIRD, OF GUNNISON, COLORADO.

FISH-SCREEN FOR ARTIFICIAL WATERWAYS.

SPECIFICATION forming part of Letters Patent No. 630,769, dated August 8, 1899.

Application filed May 4, 1899. Serial No. 715,563. (No model.)

*To all whom it may concern:*

Be it known that I, GEORGE D. BIRD, of Gunnison, in the county of Gunnison and State of Colorado, have invented a new and useful Improvement in Fish-Screens for Artificial Waterways, of which the following is a specification.

Throughout the arid and mountainous districts of the west farming operations are rendered possible only by a system of irrigation through distributing canals and ditches, the water being taken from streams which contain game and other food fish, which fish are maintained at a large expense to the different States. During the fall months the fish pass down the streams *en route* to their winter quarters and many thousands find their way into the canals and ditches and thence out into the fields and there die oftentimes by the thousands. Likewise fish find their way into the many canals, ditches, and pipe-lines used for placer-mining, milling, and power purposes and there meet sure destruction. It is not possible to maintain in these canals ordinary or stationary screens, for the reason that they soon become clogged up with leaves, moss, and other floating debris, and this either stops the flow or necessitates the constant attendance of some one to keep them clear. My invention is designed to provide a screen for this purpose which requires no attendant and which acts automatically to prevent this obstruction and yet forms an effectual barrier or screen which prevents the passage of the fish; and to this end it consists in the special construction and arrangement of a novel form of screen hereinafter shown and described, reference being had to the drawings, in which—

Figure 1:
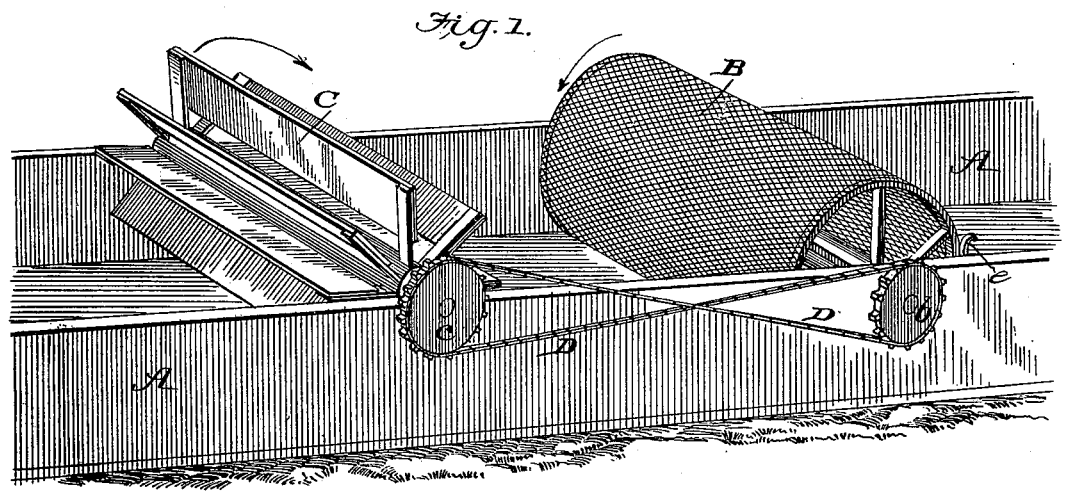
Figure 2:
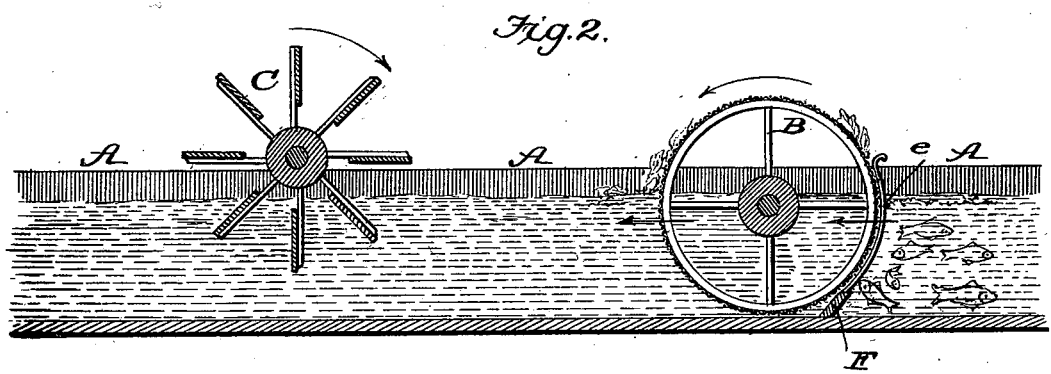

Figure 1 is a perspective view of the entire apparatus, and Fig. 2 a vertical section taken through the screen longitudinally to the canal.

In the drawings, A represents a box or flume of wood or other material, having a flat bottom and vertical sides at right angles to the bottom. B is a cylindrical screen of woven wire or other foraminous material of a mesh small enough to prevent the passage therethrough of the smallest fishes. This screen is submerged a little more than half its diameter in the water and is mounted on a horizontal shaft journaled in bearings in the sides of the flume and carrying on its end a rigidly-attached sprocket-wheel $b$.

C is a water-wheel, with paddles or buckets of any approved type, which wheel is similarly journaled in bearings in the sides of the flume at a point farther down the stream than the screen-cylinder B. This water-wheel has rigidly attached to its axis a sprocket-wheel $c$, which is connected to the sprocket-wheel $b$ of the screen-cylinder by a crossed chain belt D, so that the force of the water acting on the lower half of the water-wheel will give a reverse or overshot direction to the screen-cylinder, as shown by the arrows. In the bottom of the flume and fitted tightly and rigidly thereon there is a board E, whose upper straight edge fits close to the screen-cylinder. This board is designed to prevent the heavier debris carried down by the stream from becoming jammed under the screen-cylinder or between the cylinder and the bottom of the flume. A flange $e$ runs from the top edge of the board E to the top of the vertical sides of the flume, fitted tightly and rigidly to said sides and whose edges are curved and fit closely to the front ends of the screen to prevent the joint between the ends of the screen and the sides of the flume from becoming clogged with debris. With this apparatus it will be seen that the water passes freely through the screen, and yet the fish are not allowed to pass. Whenever leaves, moss, or other floating debris come down the stream, the force of the current passing through the meshes of the screen presses the leaves, &c., against the periphery of the screen and holds them thereagainst, and the screen, revolving, lifts them up and over the same, and when the leaves touch the water on the rear side the force of the water passing out through the screen dislodges the said leaves, &c., from the meshes of the screen, thus automatically and mechanically clearing the screen and insuring the passage of said leaves, &c., downstream.

I am aware that the general results of my invention have been aimed at by an automatic device in the nature of a series of revolving fingers acting between teeth or tines projecting upwardly from the bottom and intended to throw the leaves and trash entirely out of the flume and to one side, said revolving fingers being actuated by a water-wheel moved by the current. There is, however, no means provided for clearing away the accumulation of leaves and trash that soon pile up beside the flume and sooner or later obstruct the action of the device, and besides it is neither necessary nor desirable to take out of the water the floating debris, as it contains much fertilizing material which is of considerable value to the land. My invention, it will be seen, does not take out of the water this debris, but simply carries it over the screen and passes it along downstream with the water, but at the same time most effectually stops the passage of the fish and avoids the accumulation of trash at the apparatus.

Having thus described my invention, what I claim as new, and desire to secure by Letters Patent, is—

1. A fish-screen for canals, ditches, &c., comprising a foraminated cylinder partly submerged in the water transversely to the canal, combined with a motor for rotating it constantly by the action of the water as described.

2. A fish-screen for canals, ditches, &c., comprising a foraminated cylinder partly submerged in the water transversely of the canal, and having a drive-wheel on its end; in combination with a water-wheel arranged in the canal below the said cylinder and having a driving-wheel on its end, and a crossed belt connecting the water-wheel and the foraminated screen for a reversed motion as described.

3. A fish-screen for canals, ditches, &c., comprising a foraminated cylinder partly submerged in the water transversely to the canal, a flume carrying the water and inclosing the said cylinder, means for rotating the cylinder, and a guard with straight edge fixed in the bottom of the flume and closely approaching the periphery of the cylinder substantially as and for the purpose described.

GEORGE D. BIRD.

Witnesses:
GARWOOD O. JUDD,
GEORGE W. BARTHOLOMEW.